United States Patent [19]

Kulhavy

[11] Patent Number: 5,522,581
[45] Date of Patent: Jun. 4, 1996

[54] BALANCING HOIST AND MATERIAL HANDLING SYSTEM

[75] Inventor: Joseph A. Kulhavy, Southfield, Mich.

[73] Assignee: Zimmerman International Corp., Madison Heights, Mich.

[21] Appl. No.: 182,785

[22] Filed: Jan. 13, 1994

[51] Int. Cl.[6] ................................. B66D 1/48; B66D 1/10
[52] U.S. Cl. ........................... 254/267; 254/360; 188/185
[58] Field of Search ..................................... 254/329, 360, 254/361, 375, 378, 368, 367; 188/184, 185

[56] References Cited

U.S. PATENT DOCUMENTS

| | | | |
|---|---|---|---|
| 2,181,359 | 11/1939 | Barrett | 254/375 X |
| 2,665,111 | 1/1954 | Sokolik | 254/267 X |
| 2,710,107 | 6/1955 | Powell . | |
| 2,896,912 | 7/1959 | Faugier et al. | 254/267 X |
| 3,260,508 | 7/1966 | Powell . | |
| 3,261,477 | 7/1966 | Powell . | |
| 3,276,747 | 10/1966 | Zimmerman . | |
| 3,286,989 | 11/1966 | Bangerter et al. . | |
| 3,325,148 | 6/1967 | Powell . | |
| 3,333,821 | 8/1967 | Pohl et al. | 254/378 |
| 3,368,796 | 2/1968 | Ulbing . | |
| 3,384,350 | 5/1968 | Powell . | |
| 3,421,737 | 1/1969 | Ulbing . | |
| 3,428,298 | 2/1969 | Powell . | |
| 3,450,428 | 6/1969 | Zimmerman . | |
| 3,457,887 | 7/1969 | Powell . | |
| 3,481,582 | 12/1969 | Ulbing . | |
| 3,481,583 | 12/1969 | Ulbing . | |
| 3,491,427 | 1/1970 | Zimmerman et al. . | |
| 3,526,388 | 9/1970 | Geiger et al. . | |
| 3,621,756 | 11/1971 | Ulbing . | |
| 3,635,442 | 1/1972 | Ulbing . | |
| 3,656,715 | 4/1972 | Powell . | |

*Primary Examiner*—Daniel P. Stodola
*Assistant Examiner*—Michael R. Mansen
*Attorney, Agent, or Firm*—Vinson & Elkins

[57] ABSTRACT

A pneumatically operated balancing hoist includes a housing forming a chamber therein and an inlet for communicating with the chamber. Slidably positioned in the housing is a piston. A rotating cable drum moves longitudinally within the housing with the piston. The rotating cable drum contains one or more longitudinal openings. When the rotating cable drum is moved longitudinally, rod mechanisms slidably and longitudinally engage the cable drum through one or more longitudinal openings, causing a flywheel located at one end of the housing to rotate. When the rotation of the cable drum exceeds a predetermined speed, one or more brake shoes pivotably mounted to the flywheel will move outwardly to contact a braking surface located on the interior of the housing to stop the rotation of the cable drum. The balancing hoist of the present invention us typically part of a material handling system which includes a balancing hoist, a trolley connected to the balancing hoist, and an overhead for supporting the trolley such that the trolley can roll provide for movement of the balancing hoist throughout a facility.

25 Claims, 6 Drawing Sheets

BALANCING HOIST AND MATERIAL HANDLING SYSTEM

BACKGROUND

This invention relates to a pneumatically operated hoist and particularly to such a hoist with a braking mechanism for quickly stopping the movement of the cable of such hoist in the event of a sudden change in the load held by the hoist or the loss of the air used to operate the hoist. This hoist includes a braking mechanism that compensates for sudden acceleration of loads carried by the hoist or the sudden changes in such loads.

Pneumatic balancing hoists are well established as a standard in the materials handling industry. These pneumatic balancing hoists or air balancers, have been used to move work pieces about a factory or industrial site. A problem may occur, however, when the hook connected to the cable of the hoist suddenly has a change in the load. As a result of a change in load, for example, when the load is suddenly dropped, the force of the load pulling down on the cable and hook are suddenly no longer present to balance the air pressure contained in the air balancer. In short, a braking means for preventing the cable being pulled up abruptly or with a start has long been desired in the industry. The braking mechanism of the present invention avoids the problem not solved in the prior art that is posed by the longitudinal or axial movement of the drum used in such hoists by eliminating the axial movement from the braking surfaces such that only radial forces are involved in the braking mechanism.

A number of different variations in the design of such pneumatically operated hoists exist; such as can be seen U.S. Pat. Nos. 2,710,107, and related designs in U.S. Pat. Nos. 3,324,148 and 3,384,350, which feature a housing with an air chamber for causing rotation of a cable drum as a nut about a stationary ball screw, with a cable rotating on the cable drum and connected to a load. Air is supplied to the chamber by way of an inlet from a source of pressurized air with various means for controlling the supply of air as shown in U.S. Pat. No. 3,325,148. Each of these earlier patents is incorporated for all purposes into this application. Another design of pneumatically operated hoists can be seen in U.S. Pat. No. 3,286,989 and 3,421,737, which are incorporated herein and employ an air chamber for causing rotation of a cable inside a cylindrical bore of the housing through the use of rollers inside the drum. Again, the cable drum rotates and moves longitudinally as the cable unwinds or winds with the movement of a load.

Prior art approaches to a braking mechanism for a balancing hoist have not resolved this problem. One approach has been to control the movement of the cable by controlling the air pressure counter-balancing the load. Also, to prevent the rapid movement of the cable and load in the event of a loss of pressure in the air pressure chamber, various control mechanisms have been designed to address the sudden loss of air pressure. The designs that address the control of the air pressure, however, have the drawback of being too slow in response as it takes too long to adjust the air pressure to avoid the fast movement of the cable and hook when a load has been dropped. Another approach has been to employ a braking device on the outside of the cable drum through the use of centrifugal force once the speed of the rotation of the cable drum reaches a certain speed. This design can be seen in U.S. Pat. Nos. 2,710,107 and 3,286,989. Each of these patents discloses some braking means on the outside of the cable drum that is rotating and moving longitudinally. The problem with each of these designs is that the braking mechanism are unreliable because they must necessarily brake while moving longitudinally. As a result of this longitudinal movement, it has been found that the braking mechanism is inherently unreliable. One braking mechanism in the prior art did attempt to avoid the longitudinal movement. In U.S. Pat. No. 3,276,747, a safety device for rotatable members is disclosed that employs a plurality of pivotable dogs mounted for rotation with the cable drum. This approach, however, has been unworkable primarily because of the locking of the braking mechanism, but also because of the difficulty of installing such a design in a pneumatically operated hoist employing a housing and rotating cable drum such as disclosed and claimed herein.

SUMMARY

One object of the invention is to provide a means for braking the rotation of the cable drum in the event that the rotational speed of the drum exceeds a predetermined, safe maximum speed. Another object of the invention is to provide a means for braking the rotation of the cable drum to prevent the drum from rotating at an excessive speed.

Another object of this invention is to provide a material handling safety device having the advantages outlined herein.

Another object is to provide a material handling system such as an overhead rail system incorporating this braking mechanism for a balancing hoist.

Thus, the principle object of this invention is to provide a new and improved design for a braking mechanism in balancing hoists which substantially eliminates or minimizes the disadvantages of the prior braking mechanisms of earlier balancing hoists. Another object of this invention is to provide such a braking mechanism that is simple, involves few additional parts, and can be easily manufactured as well as easily adapted to existing balancing hoists that do not incorporate the invention.

This new braking mechanism resolves the problems of the longitudinal movement of the cable drum by locating a braking means on a separate rotational means that is connected to the cable drum such that only the rotational forces of the cable drum are translated to such rotational means. This is clone by connecting the cable drum and rotational means by way of one or more rods or other driving means that are inserted into one or more openings in the cable drum and a plate mounted on the cable drum. As the cable drum rotates on a fixed stationary screw, for example, the cable drum moves longitudinally down the rod or rods while rotating. The rotational means is also equipped with a braking mechanism that is actuated once the actual speed of the rotational means or the centrifugal force associated with such rotation reach certain predetermined values. The braking mechanism, such as a brake shoe, can then be applied against a braking surface on the interior of the housing. One principle advantage of such a design is that the braking surface on the interior of the housing is at a predetermined location on the inside of the housing, rather than at a number of different possible locations over the length of the longitudinal movement of the cable drum, which is necessarily the case when the braking mechanism must be functional at all longitudinal locations of the cable drum. The economy and ease of manufacture because of this feature of the invention is another object of this invention.

Various braking designs that depend on the centrifugal or inertial forces associated with the rotation of the rotating means can be easily substituted for the preferred embodiments disclosed herein. Similarly, this design can be employed with different types of balancing hoists besides the one disclosed in the preferred embodiment disclosed herein. For example, in the balancing hoists that employ a cable drum moving longitudinally within a cylindrical bore inside the housing, this design of braking mechanism can easily be adapted and employed as is readily apparent.

Numerous other objects and advantages of the invention will be apparent from the following detailed description of a preferred embodiment thereof, reference being made to the accompanying drawings.

DESCRIPTION OF THE EMBODIMENTS

Figure 1:
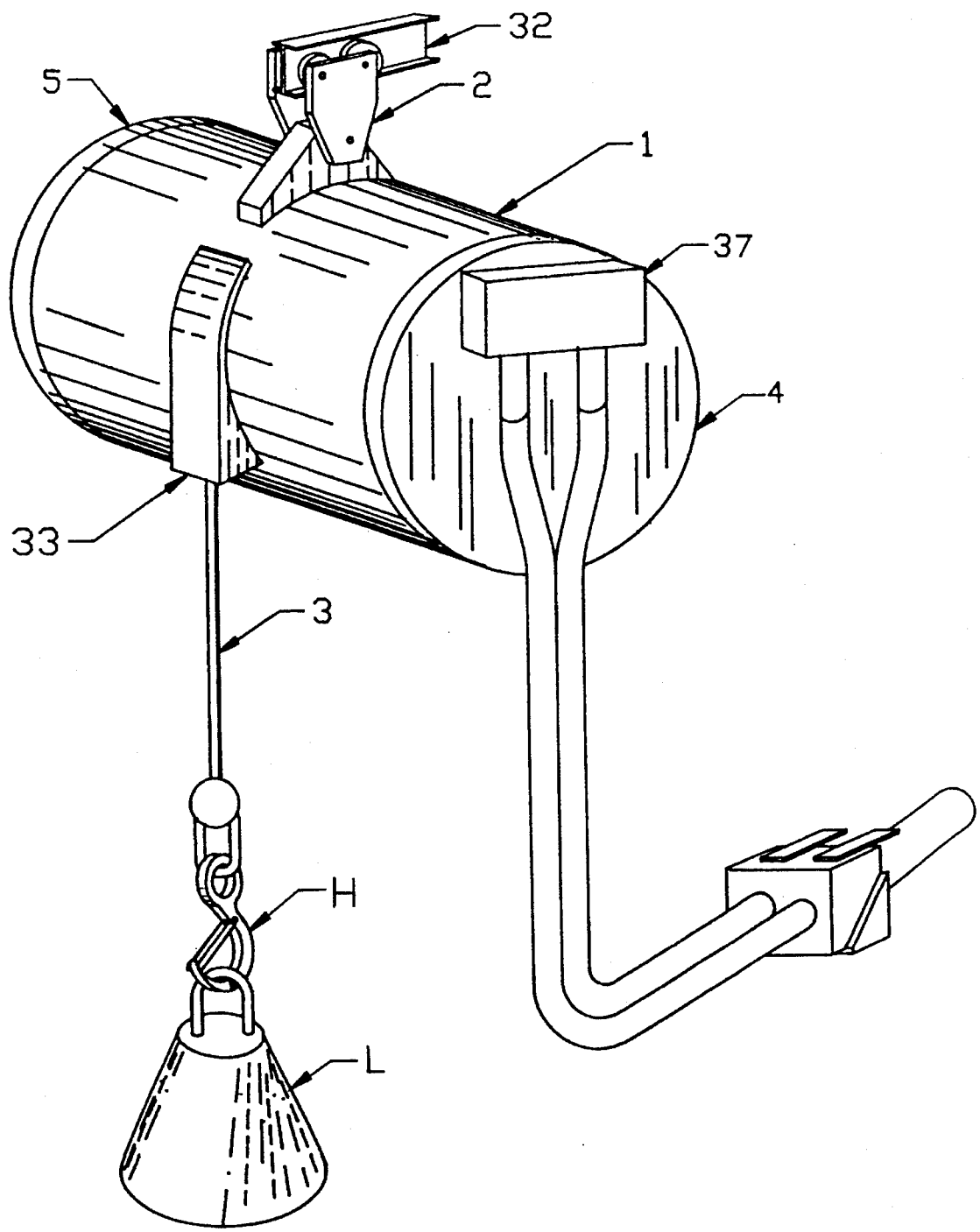
FIG. 1 is an overall perspective of a balancing hoist according to the invention shown supporting a load.

Referring to the drawings, and more particularly, to FIG. 1, a pneumatically operated hoist 1 embodying the invention is supported from an overhead rail 32 by hoist trolley 2. Extending from the hoist downward is a lifting cable 3 that passes through a cable guide 33 and can be fitted with various types of hooking mechanisms H for attaching a load L for movement. The movement of loads with such a pneumatically-operated hoist is well known in the art. It should be noted that the balancing hoist I could also be supported by a stationary mounting as well. Inlet manifold 37 allows for the passage of pressurized gases into and out of the hoist 1.

Figure 2:
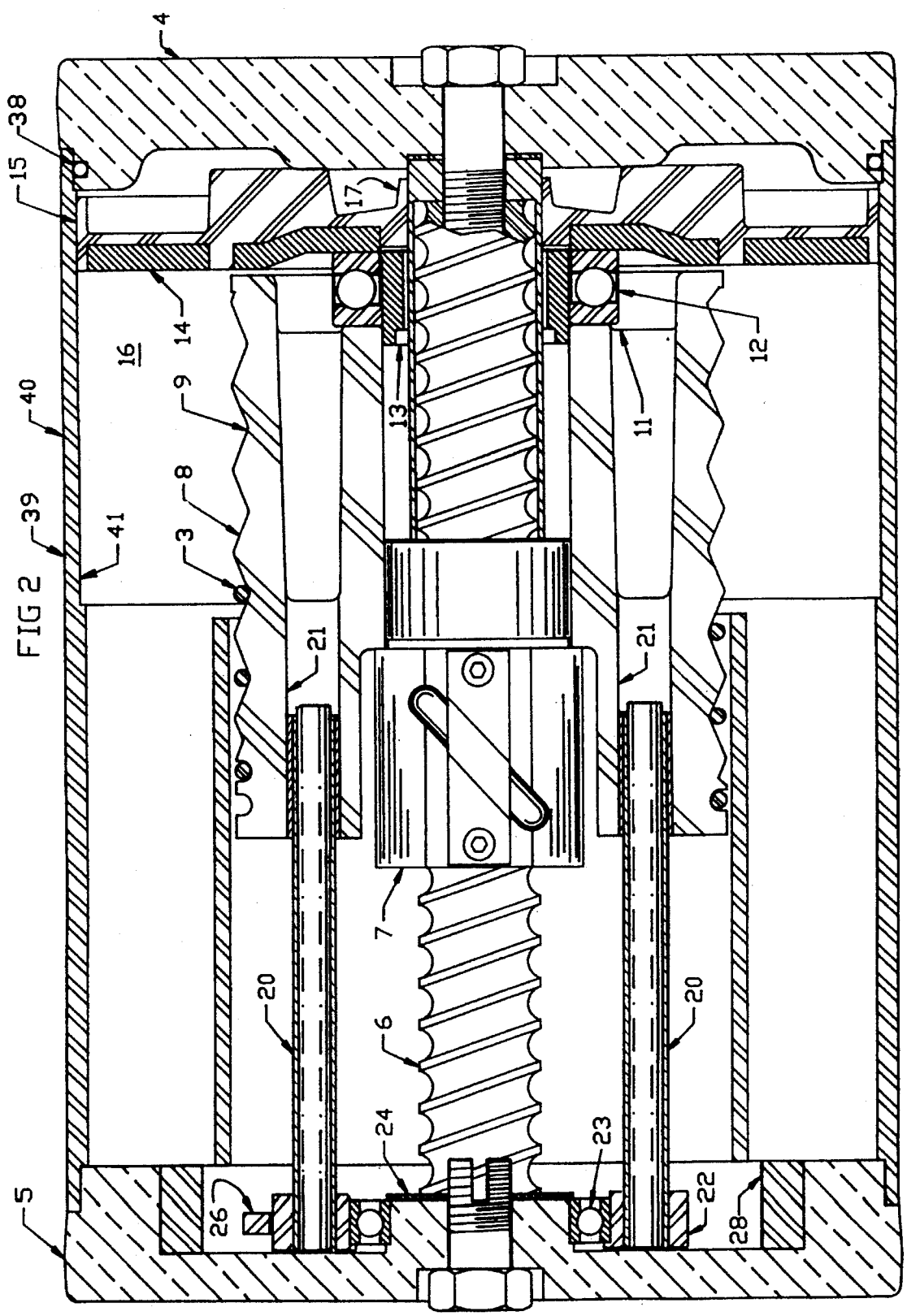
FIG. 2 is a sectional view of the preferred embodiment of the balancing hoist.
Figure 3:
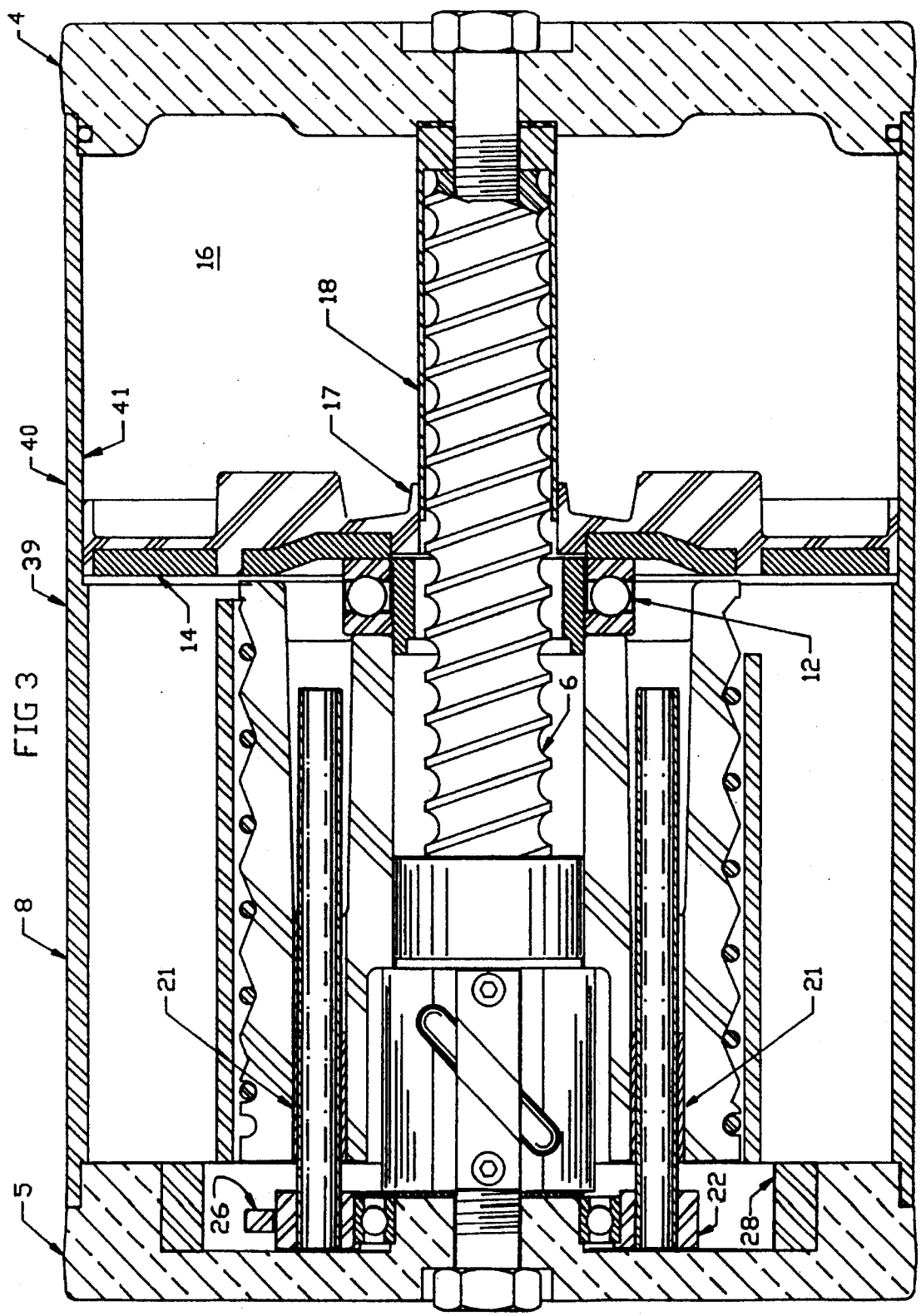
FIG. 3 is the same sectional view of the hoist, the view disclosing the operative elements thereof in positions different from those shown in FIG. 2.

Referring to FIGS. 2 and 3, the hoist includes a housing 40 having end walls 4 and 5 and a hollow casing 39 therebetween. An O-ring 38 assures a gas-tight connection between the end wall 4 and the casing 39. A ball screw 6 extends longitudinally throughout the housing 40 and is connected at each end of the housing 40 centrally to end walls 4 and 5. A ball screw assembly 7 is mounted on the ball screw 6 and moves longitudinally in the housing 40 when turned relative to the ball screw. Ball screw assemblies of this nature are known in the art and will not be discussed in detail.

A cable drum 8 is mounted on the ball screw 6 assembly 47 and moves on the ball screw 6 both rotatably and longitudinally relative to the ball screw 6. The cable drum 8 has a shallow helical groove 9 that receives the cable 3 when the load L is raised and the cable 3 is wound on the cable drum 8. One end of the cable 3 is suitably affixed to the cable drum 8 at one end of the helical groove 9. As the cable drum 8 moves rotatably and longitudinally, the cable 3 is wound or unwound about the cable drum 8 for raising and lowering loads. Whether the cable 3 is wound or unwound will obviously depend on the direction of the movement of the load being either up or down. The cable 3 passes through cable guide 33 to the various types of hooking mechanisms H for attaching a load L for movement.

A thrust bearing 12 is located adjacent to the cable drum 8 and bears against a hub portion 11 of the cable drum 8. The thrust bearing 12 is mounted on an extension 13 of the cable drum 8 and arranged to bear against a piston 14. The piston 14 has a peripheral seal 15 which engages and slides on the inner surface 41 of the housing 40 to tightly seal the gas in the chamber 16 within the housing 40. In this fashion, the second end wall 4, the right hand portion of the housing 40, and the piston 14 form a chamber 16 to receive gas for operating the hoist 1. The piston 14 has an inner diameter lip seal 17 that is in slidable but sealing contact with the sleeve 18 over the right end of the ball screw 6.

When gas is supplied to the chamber 16, air usually being used, and is under sufficient pressure, the piston 14 is moved toward the left and, by contact of the thrust bearing 12 against the hub portion 11, forces the cable drum 8 and thus the ball screw assembly 7 in the same longitudinal direction from right to left as shown in FIGS. 2 and 3. During this longitudinal movement of the cable drum 8, the ball screw assembly 7 is causes rotation of the cable drum 8 in a manner to raise and lower the cable 10 and thus raise and lower the load L. The flow of pressurized air or gas supplied to the chamber 16 can be controlled in various ways that are well known in the art and will not be discussed in detail.

Referring again to FIGS. 2 and 3, to effect the rotational movement of a flywheel or rotational means 22 displaced away and apart from the cable drum 8 at end wall 5, two drive rods 20 slidably engage two openings 21 located longitudinally in the cable drum 8. One or more drive rods 20 and longitudinal openings 21 can be employed. In the preferred embodiment disclosed herein, two such openings 21 are of sufficient length and diameter to ensure a stable and reliable rotation of the drive rods 20 as the cable drum 8 rotates with the movement of the cable 3 and, in turn, a load l.

Figure 4:
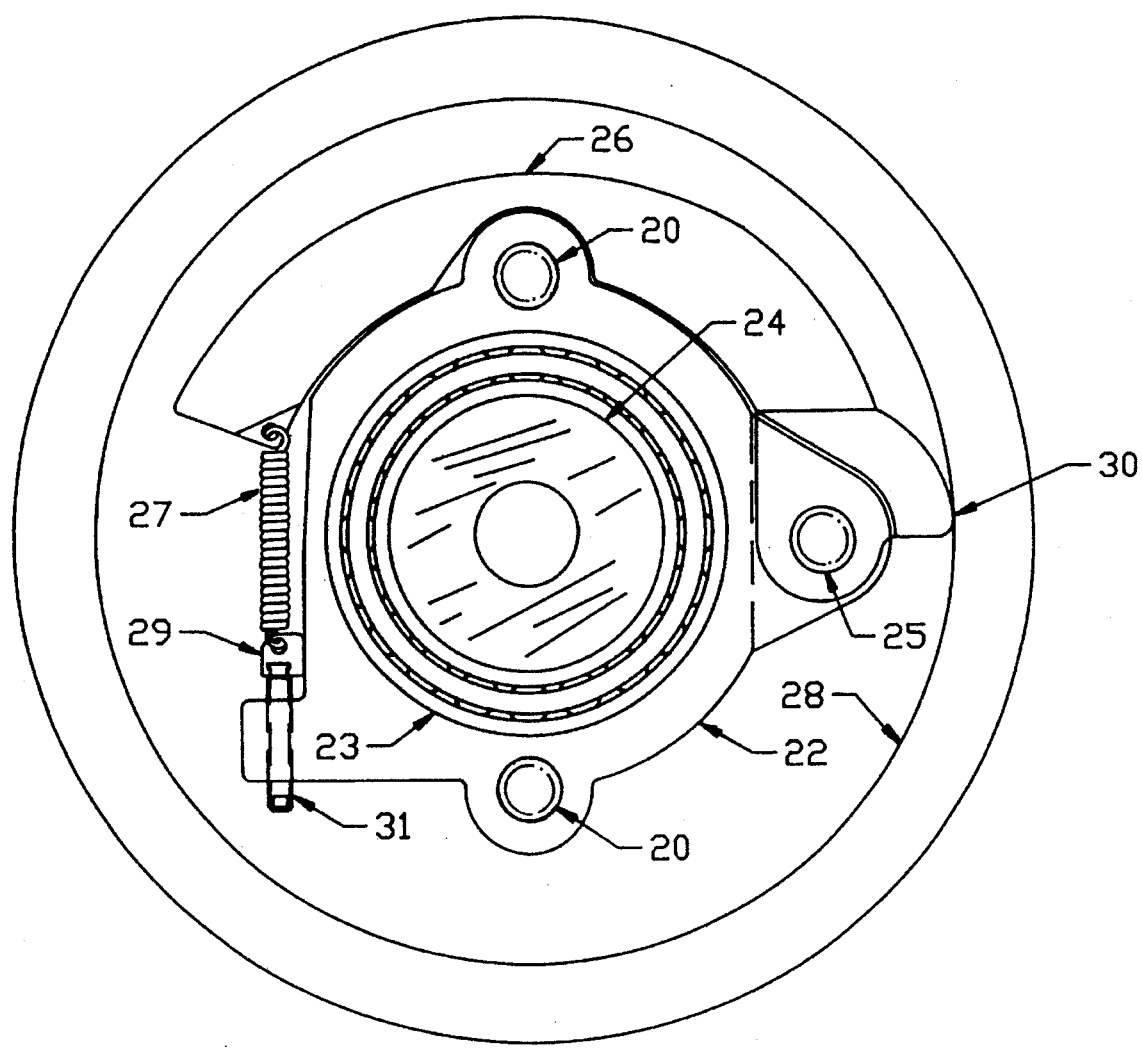
FIG. 4 is a side view of the preferred embodiment from the end of the housing wherein the rotating means and the braking mechanism are located.
Figure 5:
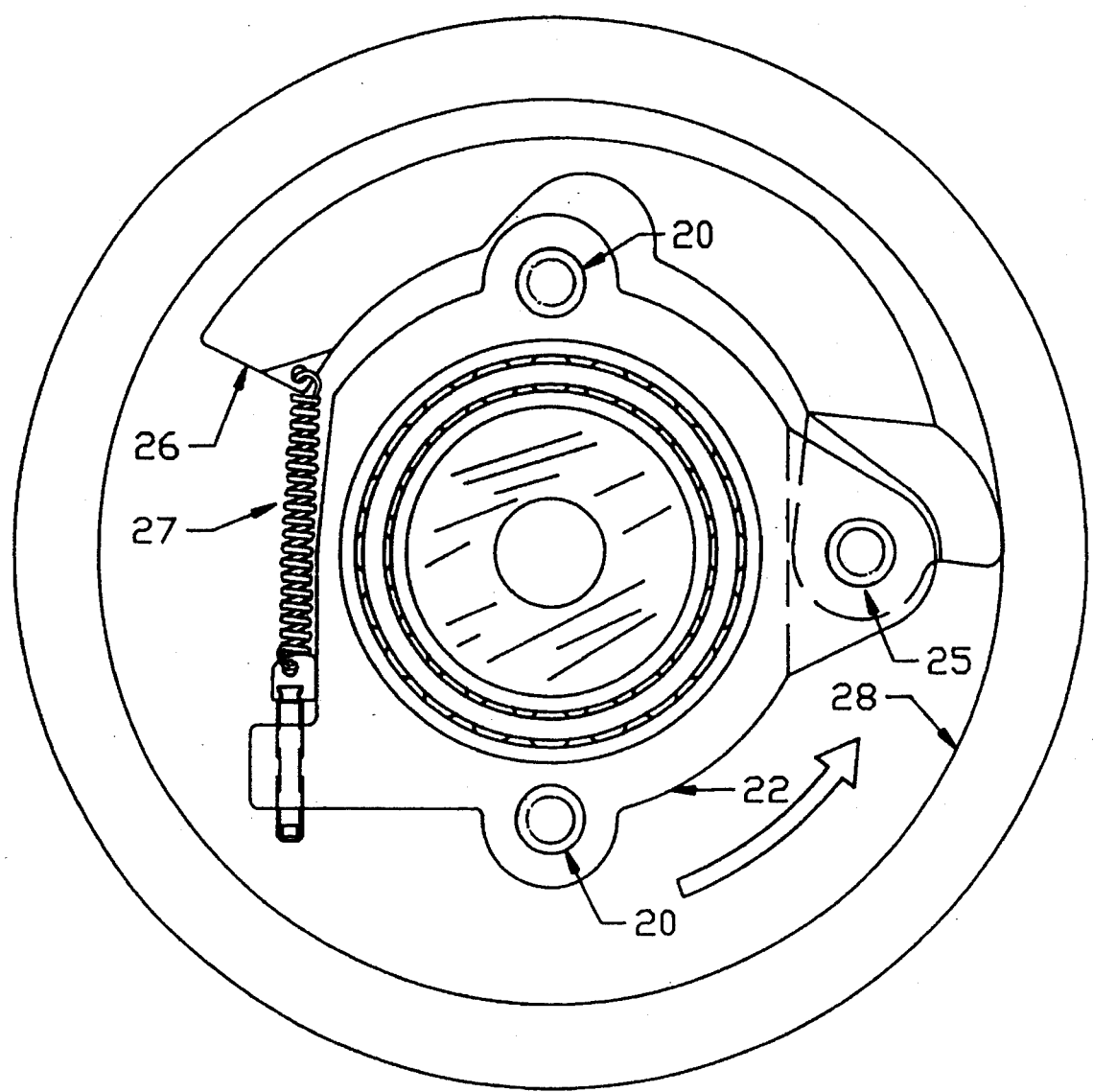
FIG. 5 is the same side view shown in FIG. 4, disclosing the operative elements thereof in positions different from those shown in FIG. 4.

Referring now to FIGS. 4 and 5, the two drive rods 20 are in turn fixably mounted to the rotational means or flywheel 22. The flywheel 22 is bored for the installation of a bearing 23 on a hub 24, which allows for a smooth and controlled rotation of the flywheel 22. At least one brake shoe 26 is mounted onto the flywheel 22 by use of pin 25 which engages both the brake shoe 26 and the flywheel 22 and, about which pin 25 and the brake shoe 26 can pivot. In FIGS. 4 and 5, one brake shoe 26 is restrained radially by a biasing means such as spring 27, which spring is connected to the brake shoe 26. (The shape of the brake shoe 26 and the location of the spring 27 can be readily varied so long as the brake shoe 26 properly contacts the braking surface 28.) The spring 27 is attached to the flywheel 22 by spring anchor 29, spring tension adjusting screw 31, which is rotatably fixed to spring anchor 29 and mounted to the flywheel 22. The tension of the spring 27 can also be adjusted by changing the hole to hole distance for the two ends of the spring 27 by turning adjusting screw 31. The outer surface 30 of the brake shoe 26 is are located adjacent to the interior wall 19 of the end covers that is mounted onto the housing 40. The end covers has been suitably bored and machined at the location of the flywheel 22 to form a braking surface 28 around the entire inner surface 28 of the end cover 5. By locating the braking surface in the end cover 5 rather than in the housing 10, it is readily apparent that one can undertake a method to retrofit and modify existing balancing hoists to incorporate the claimed invention.

Figure 6:
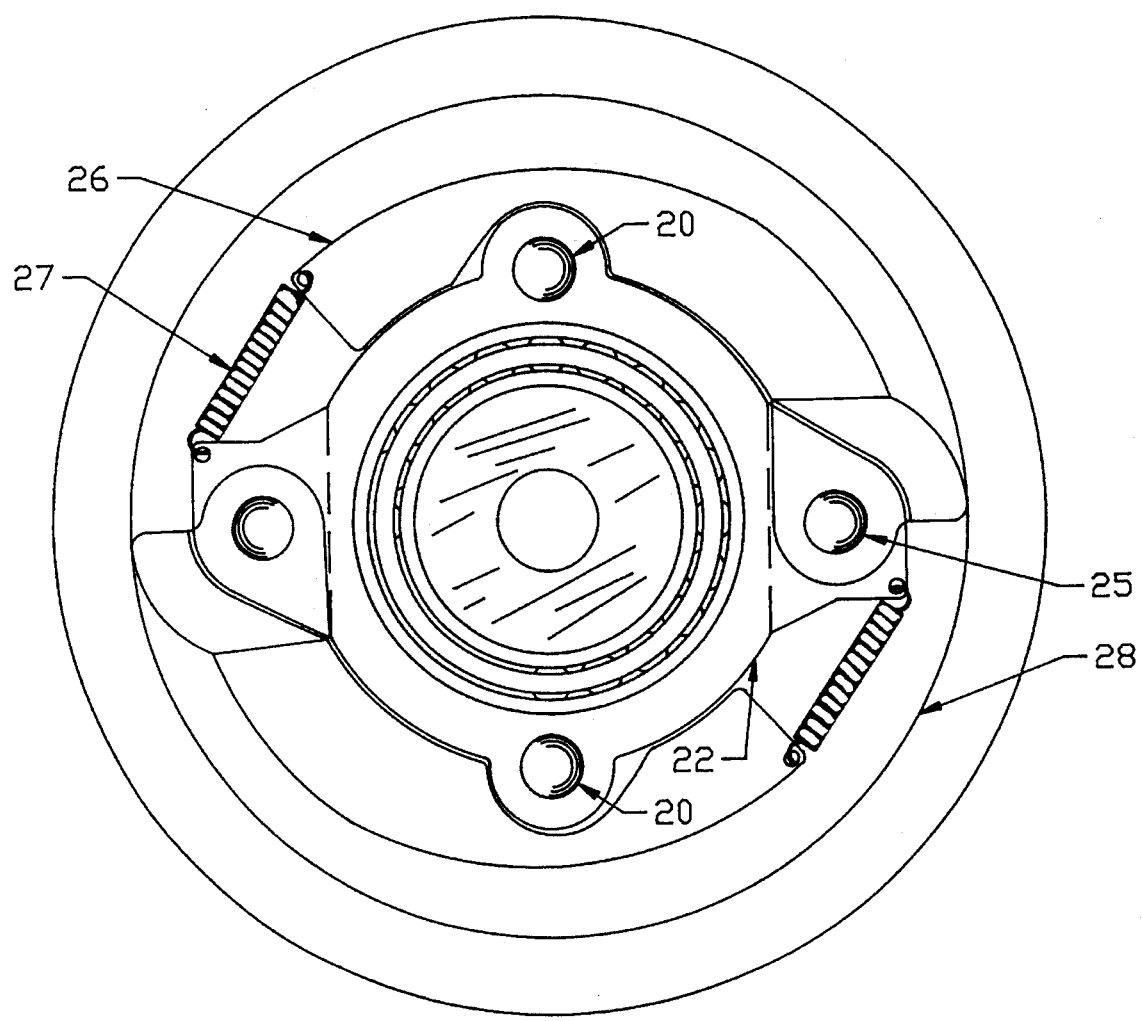
FIG. 6 is a side view of a second preferred embodiment from the end of the housing wherein the rotating means and the braking mechanism are located.

Referring now to FIG. 6, another preferred embodiment would employ two brake shoes 26a and 26b restrained radially by biasing means such as springs 27a and 27b, the tension of which can be adjusted as previously disclosed herein. The most advantageous approach for this second preferred embodiment would be to install or connect the second brake shoe 26b to the flywheel 22 directly opposite the first brake shoe 26a, such that the second brake shoe 26b would contact the braking surface 28 directly across from the braking surface 28 contacted by the first brake shoe 26a. The use of two brake shoes 26a and 26b could be employed for an especially large balancing hoist.

When the cable drum 8 rotates below a predetermined rotational speed, the brake shoe 26 is restrained in a radially inward position (as shown in FIG. 4) by the spring 27. This allows the cable drum 8 to freely rotate during routine operation of the hoist 1. When the rotation of the cable drum 8 exceeds a predetermined rotational speed or angular acceleration, however, the centrifugal force acting on the brake shoe 26 causes the brake shoe 26 to move radially outward against the restraining force of spring 27, such that the brake shoe 26 will move toward and eventually contact the braking surface 28 as shown in FIG. 5. Upon contact between the brake shoe 26 and the braking surface 28, the brake shoe 26 will become wedged against the braking surface 28 as the brake shoe 26 will pivot around pin 25 into a braking position, the brake shoe 26 functioning as a self-energizing brake. At this point, the cable drum 8 will stop rotating and the cable 3 will similarly stop its uncontrolled movement. Thus, when the mass of the brake shoe 26 resisting angular acceleration or change in the angular velocity of the cable drum 8 is caused to accelerate above the desired maximum angular acceleration, the brake shoe 26 will begin to pivot about the pin 25, out of a generally radial plane of movement (as shown in FIG. 5) until the brake shoe 26 eventually contacts the braking surface 28. Again, once the brake shoe 26 engages the braking surface 28, the brake shoe 26 will become wedged against the braking surface 28 by the centrifugal force resulting from the acceleration of the cable drum 8 and the braking mechanism will quickly bring the cable drum to a halt. The speed at which the brake shoe 28 will be moved toward brake surface 28 to halt the drum will depend on the strength of the spring 27. Similarly, the tension of the spring 27 will determine the minimum acceleration that will cause the brake shoe 26 to engage the braking surface 28 and stop the rotation of the cable the drum 8. Once the cable drum 8 has stopped rotating, however, the braking mechanism will promptly and easily disengage, thereby allowing the routine operation of the hoist 1.

As noted above, another object of this invention was to develop a braking mechanism that could be easily adapted to existing pneumatically operated balancing hoists. Thus, it is possible to modify existing hoists to incorporate this safety device by removing the existing end cover, and replace the cable drum and end cover and incorporate one or more driving rods, flywheel and the braking mechanism described herein.

Additionally, this invention could be employed with other designs of pneumatically operated hoists that do not involve the use of a stationary ball screw 6 but rather the use of cable drum rotating and moving longitudinally within a longitudinal bore inside the housing. These designs are disclosed in U.S. Pat. Nos. 3,286,989 and 3,421,737 and can easily be adapted so as to incorporate the present invention. Specifically, this could be easily done by inserting one or more drive rods into a identical number of holes in the cable drum of such alternative designs and utilizing the drive rods to turn the flywheel mounted on a shaft, with the shaft located at the opposite end of the housing from the air chamber. Thus, the flywheel would rotate around the shaft. The braking mechanism would similarly function in this design and in the event of excessive speed or acceleration of the cable drum, one or more brake shoes will contact the braking surface on the inside of the housing, thereby abruptly halting the cable drum. The adaption of the invention to this alternative design is readily apparent to one skilled in the art.

Another preferred embodiment of this invention involves the use of this invention in various materials handling systems that incorporate well known materials handling elements of rail and trolleys. For example, as shown in FIG. 1, the balancing hoist 1 can be moved through or about a facility by the movement of a hoist trolley 2 on some means for supporting the balancing hoist 1 such as an overhead rail 32. In FIG. 1, the overhead rail 32 is an I-beam rail, which is well known in the art. Similar means for movement of a hoist trolley 2 are well known in the art of materials handling. These material handling systems allow the movement of work pieces and equipment around the work space for use in an industrial process. Generally, there are two types of rail systems: (1) single rail or monorail systems; and (2) dual rail systems. FIG. 1 shows the means of moving the balancing hoist through the use of a single trolley on one beam or support. Single rail systems, or monorail systems, would similarly function like the overhead support shown in FIG. 1. Single rail systems involve the use of one rail to move the various work pieces by rolling the wheels of the trolley and in turn the balancing hoist along the rail. A dual rail system allows for the use of a carriage or bridge, which can be connected to the balancing hoist. The carriage and bridge move on the rails by use of trolleys mounted on the carriage. It should be noted that facilities can also easily employ the use of precision rail overhead conveyance systems with rails having shapes other than the I-beam rail shown in FIG. 1. These various rail systems are well known in the art and commercially available from Zimmerman International Corp. located in Madison Heights, Mich. Thus, material handling systems can incorporate the balancing hoists disclosed herein. A "facility" shall refer to any industrial, manufacturing, fabricating, warehousing, processing, or repairing facility in any field of application in which it is necessary to transport, manipulate, or move work pieces or finished products. In short, a facility is any location at which it is necessary to employ materials handling equipment to transport, manipulate, or move work pieces such as an automotive plant, a product warehouse, or equipment manufacturing plant.

Although several embodiments of the invention are illustrated and described in detail, it will be understood that the invention is not limited merely to the embodiments described herein, but contemplates other embodiments and variations that utilize the concepts and teachings of this invention.

Having thus described the invention, I claim:

1. A balancing hoist for raising and lowering loads comprising:

a hollow housing and two end walls forming a chamber, said housing further including an inlet manifold for passage of pressurized gas into and out of said chamber;

a piston movable by said pressurized gas slidably positioned within said chamber;

a cable drum located within said housing, said cable drum being movable longitudinally within said housing together with said piston, said cable drum containing at least one longitudinal opening;

stationary means within said housing for rotatably supporting said cable drum, said cable drum being caused to rotate when said piston and said cable drum are moved together longitudinally within said housing;

a cable affixed to said cable drum such that said cable is wound and unwound about said rotating cable drum when raising and lowering loads;

at least one rod means which slidably and longitudinally engages said cable drum through said at least one longitudinal opening;

a flywheel fixedly connected to said at least one rod means and adjacent to one of said end walls, said flywheel being coaxial with said means for rotatably supporting said cable drum; and a braking mechanism mounted on said flywheel;

whereby when the rotation of the cable drum exceeds a predetermined speed, said braking mechanism will stop the rotation of said cable drum.

2. The balancing hoist for raising and lowering loads as defined in claim 1, wherein said braking mechanism further includes:

at least one brake shoe pivotably mounted on said flywheel;

a spring connected to both said flywheel and said at least one brake shoe such that said spring restrains said at least one brake shoe in a radially inward position against radial outward movement until the rotation of said rotatable cable drum exceeds a predetermined speed; and a braking surface within said housing for contacting with said at least one brake shoe.

3. The balancing hoist as defined in claim 2, wherein said end wall located adjacent said flywheel includes said braking surface.

4. The balancing hoist as defined in claim 2 wherein said spring is adjustable.

5. A balancing hoist for raising and lowering loads comprising:

a housing forming a chamber, said housing further including a manifold for communicating with said chamber;

a piston slidably positioned within said chamber, said piston being movable within said chamber in response to gas pressure within said chamber;

a cable drum located in said housing, said cable drum being movable longitudinally within said housing together with said piston, said cable drum containing at least one longitudinal opening;

a stationary ball screw mounted axially within said housing, said stationary ball screw rotatably supporting said cable drum, said cable drum being caused to rotate by the threadable engagement with said stationary ball screw when said piston and said cable drum are moved together longitudinally within said housing;

a cable affixed to said cable drum such that said cable is wound and unwound about said rotating cable drum when raising and lowering loads;

at least one rod means slidably engaging said cable drum, said at least one rod means longitudinally aligned with said stationary ball screw;

a flywheel fixedly connected to said at least one rod means and concentrically aligned with stationary ball screw;

a braking mechanism mounted on said flywheel;

whereby when the rotation of said cable drum exceeds a predetermined speed, said braking mechanism will stop the rotation of said cable drum.

6. The balancing hoist for raising and lowering loads as defined in claim 5, wherein said braking mechanism further includes:

at least one brake shoe pivotably mounted on said flywheel;

a spring connected to both said flywheel and said at least one brake shoe such that said spring restrains said at least one brake shoe in a radially inward position against radial outward movement until the rotation of said rotatable cable drum exceeds a predetermined speed; and a braking surface within said housing for contacting with said at least one brake shoe.

7. The balancing hoist for raising and lowering loads as defined in claim 6, wherein said spring is adjustable.

8. A balancing hoist for raising and lowering loads comprising:

a hollow housing and two end walls forming a chamber, said housing further including a manifold for passage of pressurized gas into and out of said chamber;

a piston movable by said pressurized gas slidably positioned within said chamber;

a cable drum located within said housing, said cable drum being movable longitudinally within said housing together with said piston, said cable drum containing at least one longitudinal opening;

stationary means within said housing for rotatably supporting said cable drum, said cable drum being caused to rotate when said piston and said cable drum are moved together longitudinally within said housing;

a cable affixed to said cable drum such that said cable is wound and unwound about the said rotating cable drum when raising and lowering loads;

at least one rod means which slidably and longitudinally engages said cable drum through said at least one longitudinal opening;

a flywheel fixedly connected to said at least one rod means and adjacent to one of said end walls, said flywheel being coaxially aligned with said means for rotatably supporting said cable drum;

at least one brake shoe pivotably mounted to said flywheel;

a spring mounted on said flywheel and connected to said at least one brake shoe such that said spring restrains said at least one brake shoe against outward radial movement until the rotational speed of said cable drum exceeds a predetermined speed; and a braking surface within said housing for contacting with said at least one brake shoe.

9. The balancing hoist as defined in claim 8 wherein said end wall located adjacent said flywheel includes said braking surface.

10. The balancing hoist as defined in claim 9 wherein said spring is adjustable.

11. A balancing hoist for raising and lowering loads comprising:

a housing forming a chamber, said housing further including a manifold for communicating with said chamber;

a piston slidably positioned within said chamber, said piston being movable within said chamber in response to gas pressure within said chamber;

a cable drum located within said housing, said cable drum being movable longitudinally within said housing together with said piston, said cable drum containing at least one longitudinal opening;

a stationary ball screw mounted axially within said housing, said stationary ball screw rotatably supporting said cable drum, said cable drum being caused to rotate by threadable engagement with said stationary ball screw when said piston and said cable drum are moved together longitudinally within said housing;

a cable affixed to said cable drum such that said cable is wound and unwound about said rotating cable drum when raising and lowering loads;

at least one rod means slidably engaging said cable drum, said at least one rod means longitudinally aligned with said stationary ball screw;

a flywheel fixedly connected to said at least one rod means and concentrically aligned with said stationary ball screw;

at least one brake shoe pivotably mounted to said flywheel;

a spring mounted on said flywheel and connected to said at least one brake shoe such that such spring restrains said at least one brake shoe against outward radial movement until the rotational speed of said rotatable cable drum exceeds a predetermined speed; and a braking surface within said housing for contacting said at least one brake shoe.

12. The balancing hoist as defined in claim 11 wherein said spring is adjustable.

13. A material handing system comprising:

a balancing hoist for raising and lowering loads including:
   a hollow housing and two end walls forming a chamber, said housing further including a manifold for passage of pressurized gas into and out of said chamber;
   a piston movable by said pressurized gas slidably positioned within said chamber;
   a cable drum located within said housing, said cable drum being movable longitudinally within said housing together with said piston, said cable drum containing at least one longitudinal opening;
   stationary means within said housing for rotatably supporting said cable drum, said cable drum being caused to rotate when said piston and said cable drum are moved together longitudinally within said housing;
   a cable affixed to said cable drum such that said cable can is wound and unwound about said rotating cable drum when raising and lowering loads;
   at least one rod means which slidably and longitudinally engages said cable drum through said at least one longitudinal opening;
   a flywheel fixedly connected to said at least one rod means and adjacent to one of said end walls, said flywheel being coaxial with said means for rotatably supporting said cable drum; and
   a braking mechanism mounted on said flywheel;
   whereby when the rotation of said cable drum exceeds a predetermined speed, said braking mechanism will stop the rotation of said rotatable cable drum;

a trolley connected to said balancing hoist; and an overhead means for supporting said trolley such that said trolley can roll and thereby allow for movement of said balancing hoist throughout a facility.

14. The material handling system as defined in claim 13, wherein said braking mechanism further includes:

at least one brake shoe pivotably mounted on said flywheel; and a spring connected to said flywheel and said at least one brake shoe such that such spring restrains at least one brake shoe in a radially inward position against radial outward movement until the rotation of said rotatable cable drum exceeds a predetermined speed.

15. The material handling system as defined in claim 14 wherein said end wall adjacent said flywheel includes said braking surface.

16. The material handling system as defined in claim 14 wherein said spring is adjustable.

17. A material handling system comprising:

a balancing hoist for raising and lowering loads including:
   a housing forming a chamber, said housing further including a manifold for communicating with said chamber;
   a piston slidably positioned within said chamber, said piston being movable within said chamber in response to gas pressure within said chamber;
   a cable drum located within said housing, said cable drum being moveable longitudinally within said housing together with said piston, said cable drum containing at least one longitudinal opening;
   a stationary ball screw mounted axially within said housing, said stationary ball screw rotatable supporting said cable drum, sad cable drum being caused to rotate by threadable engagement with said stationary ball screw when said piston and said cable drum are moved together longitudinally within said housing;
   a cable affixed to said cable drum such that said cable is wound and unwound about said rotating cable drum when raising and lowering loads;
   at least one rod means slidably engaging said cable drum, said at least one rod means longitudinally aligned with said stationary ball screw;
   a flywheel fixedly connected to said at least one rod means and concentrically aligned with said stationary ball screw;
   a braking mechanism mounted on said flywheel;
   whereby when the rotation of said cable drum exceeds a predetermined speed, said braking mechanism will stop the rotation of said cable drum, a trolley connected to said balancing hoist; and an overhead means for supporting said trolley such that said trolley can roll and thereby allow for movement of said balancing hoist throughout a facility.

18. The material handling system as defined in claim 17, wherein said braking mechanism further includes:

at least one brake shoe pivotably mounted on said flywheel; and a spring connected to both said flywheel and said at least one brake shoe such that said spring restrains said at least one brake shoe in a radially inward position against radial outward movement until the rotation of said rotatable cable drum exceeds a predetermined speed.

19. The material handing system as defined in claim 18 wherein said spring is adjustable.

20. A material handling system comprising:

a balancing hoist for raising and lowering loads including:
   a hollow housing and two end walls forming a chamber, said chamber further including a manifold for the passage of pressurized gas into and out of said chamber;
   a piston movable by said pressurized gas slidably positioned within said chamber;

a cable drum located within said housing, said cable drum being movable longitudinally within said housing together with said piston, said cable drum containing at least one longitudinal opening;

stationary means within said housing for rotatably supporting said cable drum, said cable drum being caused to rotate when said piston and said cable drum are moved together longitudinally within said housing;

a cable affixed to said cable drum such that said cable is wound and unwound about said rotating cable drum when raising and lowering loads;

at least one rod means which slidably and longitudinally engages said cable drum through said at least one longitudinal opening;

a flywheel fixedly connected to said at least one rod means and adjacent to one of said end walls, said flywheel being coaxial with said means for rotatably supporting said cable drum;

at least one brake shoe pivotably mounted to said flywheel;

a spring mounted on said flywheel and connected to said at least one brake shoe such that said spring restrains said at least one brake shoe against outward radial movement until the rotational speed of said rotatable cable drum exceeds a predetermined speed;

a trolley connected to said balancing hoist;

an overhead means for supporting said trolley such that said trolley can roll and thereby allow for movement of said balancing hoist throughout a facility; and a braking surface within said housing for contacting said at least one brake shoe.

21. The material handling system as defined in claim 20 wherein said end wall located adjacent said flywheel includes said braking surface.

22. The material handling system as defined in claim 20 wherein said spring is adjustable.

23. A material handling system comprising:

a balancing hoist for raising and lowering loads including:

a housing forming a chamber, said housing further including a manifold for communicating with said chamber;

a piston slidably positioned within said chamber, said piston being movable within said chamber in response to gas pressure within said chamber;

a cable drum located within said housing, said cable drum being movable longitudinally within said housing together with said piston, said cable drum containing at least one longitudinal opening;

a stationary ball screw mounted axially within said housing, said stationary ball screw rotatably supporting said cable drum, said cable drum being caused to rotate by threadable engagement with said stationary ball screw when said piston and said cable drum are moved together longitudinally within said housing;

a cable affixed to said cable drum such that such cable is wound and unwound about said rotating cable drum when raising and lowering loads;

at least one rod means slidably engaging said cable drum, said at least one rod means longitudinally aligned with said stationary ball screw;

a flywheel fixedly connected to said at least one rod means and concentrically aligned with said stationary ball screw;

at least one brake shoe pivotably mounted to said flywheel;

a spring mounted on said flywheel and connected to said at least one brake shoe such that said spring restrains said at least one brake shoe against outward radial movement until the rotational speed of said rotatable cable drum exceeds a predetermined speed;

a trolley connected to said balancing hoist;

an overhead means for supporting said trolley such that said trolley can roll and thereby allow for movement of said balancing hoist throughout a facility; and a braking surface within said housing for contacting said at least one brake shoe.

24. The material handling system as defined in claims 23 wherein said spring is adjustable.

25. A balancing hoist for raising and lowering loads comprising:

a housing forming a chamber, said housing having a cylindrical bore and a manifold for communicating with said chamber;

a piston slidably positioned within said chamber, said piston being movable within said chamber in response to gas pressure within said chamber;

a cable drum positioned within said cylindrical bore, said cable drum being caused to rotate within said cylindrical bore as it moves longitudinally through said chamber along with said piston, said cable drum containing at least one longitudinally opening there through;

a cable affixed to said cable drum, such that said cable can be wound and unwound about said rotating cable dram when raising and lowering loads;

at least one rod means slidably engaging said cable drum, said at least one rod means longitudinally aligned with said cable drum;

a flywheel fixedly connected to said at least one rod means and concentrically aligned with said cable drum;

at least one brake shoe pivotably mounted to said flywheel;

a spring mounted on said flywheel and connected to said at least one brake shoe such that said spring restrains said at least one brake shoe against radial movement until the rotational speed of said cable drum exceeds a predetermined speed; and a braking surface within said housing for contacting with said at least one brake shoe.

* * * * *